Patented Aug. 25, 1942

2,294,246

UNITED STATES PATENT OFFICE 2,294,246

PRINTING PASTE FOR TEXTILE PRINTING

Lester E. Schniepp and Wilber O. Teeters, Wilmington, Del., assignors to E. I. du Pont de Nemours & Company, Wilmington, Del., a corporation of Delaware No Drawing. Application September 24, 1940, Serial No. 358,108

8 Claims. (Cl. 8—62)

This invention relates to the printing of textiles wherein water-solubilized derivatives of insoluble dyes are used as the dyestuff ingredient of the printing pastes, the solubilizing groups being acyl groups of a kind which can be hydrolyzed off by chemical reagents after the dyestuff derivative is applied to the fabric, thereby regenerating the insoluble dye and producing an insoluble dyeing; and especially to improvements in the printing compositions containing such dyestuffs and to processes.

The solubilized derivatives of the insoluble dyes are condensation products which are represented by the general formula R—M in which R is the radical of the insoluble dye, such as an insoluble azo, nitro, anthraquinone, triphenylmethane, azine or oxazine dye. It contains at least one group of the class consisting of hydroxy and imino (i. e., an —NH— group) that is capable of being condensed with a water-solubilizing acyl group. The symbol M represents the radical of the water-solubilizing acyl group. It must be capable of being hydrolyzed off by the action of alkalis after the condensation product is applied to the fiber. The symbol R represents the radical of any insoluble dye of the kind described, such as an insoluble azo, nitro, anthraquinone, triphenylmethane, azine or oxazine dye. The subsequent saponification splits off the acyl group, regenerates the insoluble dye on the fiber and eventually produces superior fastness properties.

The solubilized derivatives, R—M are used in their aqueous solutions or suspensions to produce dyeings or printings on desired materials as by dyeing, padding or printing by known methods. The dyeing is then subjected to a saponifying treatment as with alkaline reagents, such as solutions of ammonia, sodium carbonate, caustic soda, or trisodium phosphate. Upon saponification of the acyl group the initially soluble acylated derivative of the insoluble or sparingly soluble dye becomes fixed on the fiber as an insoluble dyeing. The simplest forms of such dye derivatives contain only one M— group but more than one may be present.

Heretofore difficulty has been encountered in producing fully satisfactory strong and bright prints from printings made with such solubilized dyestuffs. Consequently many of the otherwise valuable properties of the dyes have not been made fully available in printing practices. In printing with this type of dyes it was also known that some kind of a printing assistant was desirable in the printing paste in order to produce desirable dyeings with such dyestuffs, but the known operable assistants were relatively high molecular weight compounds, often technically difficult and costly to manufacture in good yield. The printing of textiles with these colors was not entirely satisfactory for reasons such as cost of the assistants, stability of the printing compositions, difficulty of manipulation in making the printing paste or by reason of some disadvantageous property which the assistant imparted to the printing paste or printed textile, such as an unpleasant odor. Consequently many of the valuable properties of the dyes had not been made available and improvements were desirable.

It is among the objects of this invention to provide brighter prints upon textiles which are printed with such solubilized dye derivatives, than have hitherto been possible. Another object is to provide stronger prints from a given amount of dye derivative. Another object is to avoid the use of costly assistants and those which have an unpleasant odor. A further object is to provide new printing pastes and processes. Still other objects of the invention will be apparent from the following description. The objects of this invention are accomplished in general by incorporating into a hydrous solution or printing paste containing the water-solubilized dyestuff of the kind described, an assistant composed of an aliphatic carboxylic acid ester which is represented by the formula

$$(HO-C_nH_{2n}-COO)_m-R-(OH)_{x-m}$$

in which $n$ is 1 to 3; $-R-(OH)_{x-m}$ is the residue of an alcohol of the group consisting of ethyleneglycol, propylene glycol, glycerol and trimethylene glycol; $x$ is the number of hydroxy groups in the unesterified alcohol; and $m$ is an integer from 1 to the value of $x$.

The invention will be more fully set forth in the following more detailed description which includes examples that are given as illustrative embodiments of the invention and not as limitations thereof. Parts are expressed in parts by weight unless otherwise noted.

*Example I*

Six grams of the product prepared by the action of benzoic-acid-m-sulfon chloride on the azo dye obtained by coupling diazotized 2-amino-4-chloro-diphenyl ether to the anilide of 2-hydrxy-3-naphthoic acid were dissolved in a mixture of 9 g. of ethylene glycol-mono-glycolic acid ester and 29 cc. of water. To this were added 50 g. of starch-tragacanth thickening and 6 g. of a 20% solution of tri-sodium phosphate. The paste was mixed thoroughly and printed from an engraved roll onto cotton cloth. The cloth was dried thoroughly in a hot-air drier and aged for 10 minutes in a rapid ager of the Mather-Platt type. The print was finished as follows, namely by immersing it for 5 minutes in a cold water solution containing 15 grams per liter of barium chloride, 50 grams per liter of common salt and 30 cc. per liter of 36° Bé. caustic soda solution so as to hydrolyze off the acyl group of the acylated dyestuff and then neutralizing by treating for 3 minutes at 140° F. in a bath containing 5 cc. of 37% hydrochloric acid per liter, followed by rinsing, soaping 5 minutes at 160° F., rinsing and drying. A red print resulted which was superior in strength and brilliancy to that obtained by treating the same fabric in the same way except that the paste did not contain an assistant.

*Example II*

Cotton cloth was printed with a paste having the following composition by weight:

| | Parts |
|---|---|
| The product prepared by the action of benzoic-acid-m-sulfon chloride on the azo dye obtained by coupling diazotized 2-amino-4-chloro-diphenyl ether to the anilide of 2-hydroxy-3-naphthoic acid | 1.5 |
| Ethylene-glycol-diglycolic acid ester | 18 |
| Water | 24.5 |
| Starch-tragacanth thickening | 50 |
| 20% tri-sodium-phosphate solution | 6 |

The printed cloth was finished as described in Example I. A red print was obtained which was greatly superior with respect to brilliancy and strength as compared to a print made on the same fabric in the same way except that the paste did not contain an assistant, and also very much stronger than that produced when an equal weight of thiodiglycol was substituted for the ethylene-glycol-diglycolic acid ester.

*Example III*

Cotton cloth was printed from an engraved roll with a paste having the following composition by weight:

| | Parts |
|---|---|
| The product prepared by the action of benzoic-acid-m-sulfon chloride on the azo dye obtained by coupling diazotized 2-amino-4-chloro-diphenyl ether to the anilide of 2-hydroxy-3-naphthoic acid | 6 |
| Glycerol-mono-glycolic acid ester | 9 |
| Water | 29 |
| Starch-tragacanth thickening | 50 |
| 20% tri-sodium-phosphate solution | 6 |

The printed cloth was finished exactly as described in Example I. The red print obtained had better strength and brilliance than a print made on the same fabric and in the same way except that the paste did not contain an assistant.

*Example IV*

A printing paste having the following composition was printed from an engraved roll on cotton cloth.

| | Grams |
|---|---|
| The product prepared by the action of benzoic-acid-m-sulfon chloride on the azo dye obtained by coupling diazotized 2-amino-4-chloro-diphenyl ether to the aniline of 2-hydroxy-3-naphthoic acid | 6 |
| Glycerol-diglycolic acid ester | 18 |
| Water | 20 |
| Starch-tragacanth thickening | 50 |
| 20% tri-sodium phosphate solution | 6 |

The printed cloth was given the finishing treatment described in Example I. A red print was obtained which was much brighter and stronger than a print made on the same cloth and in the same way except that the paste did not contain an assistant.

The acid radicals of the assistants which are represented by the formula $$(HO-C_nH_{2n}-COO)_m-R-(OH)_{x-m}$$

are straight or branched chain mono-hydroxy aliphatic carboxylic acid radicals such as the indicated radicals of hydroxy acetic acid (glycolic acid), alpha- and beta-hydroxy propionic acid and the isomeric forms of hydroxy-butyric- and hydroxy-isobutyric-acids such as alpha, beta- and gamma-hydroxy-butyric acid and alpha- and beta-hydroxy-isobutyric acid. The alcohol radicals of the esters are the radicals of ethylene-glycol, propylene glycol, glycerol and trimethylene glycol. In forming the esters one, or more, or all of the hydroxy groups of the alcohol may be condensed with any of the acids of the described class, in consequence of which the alcohol group may carry from 1 to as many acid groups as there were hydroxy groups in the unesterified alcohol. Further illustrations of the above described assistants which can be used in the same way and with the same effect as those heretofore mentioned are: ethylene-glycol-diglycolate, ethylene-glycol-mono-glycolate, ethylene-glycol-mono-lactate, ethylene-glycol-dilactate, ethylene-glycol-mono-beta-hydroxy-butyrate, ethylene-glycol-mono-beta-hydroxy-isobutyrate, trimethylene-glycol-mono-glycolate, propylene-glycol-mono-glycolate, glycerol-mono-lactate, glycerol-diglycolate, gycero-triglycolate, glycerol-di-lactate-glycerol-mono-beta-hydroxy-butyrate.

In the foregoing examples the pastes contain trisodium phosphate in sufficient amount to prevent the paste from becoming acid upon prolonged storage but insufficient to hydrolyze the soluble acylated dye. Any equivalent alkaline buffer can be used instead of tri-sodium phosphate, such as other alkali-metal phosphates and the alkali-metal carbonates. The printing paste preferably contains a buffer, especially when the paste is not to be used within a relatively short time after it is prepared, but the presence of a buffer is optional when the paste is to be used soon after it is prepared.

Water is present in the paste in at least sufficient amount to provide a smooth uniform composition. More or less can be present with a given amount of other constituents according to the consistency desired.

Any amount of a thickening agent can be used which will give the printing paste a viscosity which is suitable for printing. Any of the materials useful for making thickening agents for printing pastes can be used instead of starch and gum tragacanth, such as starch only, locust bean gum, gum karaya, gum tragacanth only, gum arabic, dextrin, agar, vegetable colloid and various mixtures of these materials. More or less of the thickening agent will be required in order that the printing paste will have a suitable viscosity to operate satisfactorily on the etched roller or other printing device. The proportion can be widely varied and determined by experiment according to various circumstances, such as the characteristics of the printing member and the material upon which the prints are to be disposed.

The proportion of dye derivative in the paste can be varied over a wide range according to the depth of shade desired in the final print. More or less of the dye derivative per unit of printing paste generally produces a greater or less depth of shade as the case may be. Any proportion of dyestuff derivative which is sufficient to give a print can be used.

A noticeable effect in the brilliance and strength of the prints is produced when the printing paste contains at least a significant amount of assistant, say about 1% of the weight of the printing paste. Any significant amount of assistant can be present. However, the presence of more than about 35% of assistant is generally excessive. Excessive amounts can be present but they are unnecessary. The preferred proportion of assistant in the paste is about 7% to about 20% by weight.

The preferred modifications consist of the mono- and diglycolic esters of ethylene glycol and glycerol. That is, compounds of the formula $(HO-C_nH_{2n}-COO)_m-R-(OH)_{x-m}$ where $n=1$, $m=1$ or 2 and R is the radical corresponding to ethylene glycol and glycerol. Among these, the assistants recited in Examples 1, 2 and 3 are preferred.

In the foregoing illustrations the prints were produced on cotton cloth but the invention is not restricted to cotton fibers. The invention is applicable to all dyeable fabrics which are susceptible to dyeing with the described class of dyes. A wide variety of fibers such as linen, jute, ramie, regenerated cellulose, cellulose esters and ethers, wool, silk, mixtures of these fibers and the like can be used. Wide variations can be made in the finishing process. For example, any strong alkaline reagent which is sufficient in concentration to saponify the acyl group of the dye derivative on the fiber and yield the insoluble azo dye can be used. The desired saponifying agent can be selected in view of the kind of fiber dyed, the speed of saponification desired and other variables. In like manner the final acid treatment, the time and temperature of treatment and the concentrations of reagents can be selected over a wide range.

As other illustrations of water-solubilized derivatives of insoluble dyes having the formula R—M as hereinbefore described and which give improved results when used with the assistants described herein are the product of the reaction between benzoic-acid-m-sulfon-chloride and the azo dye alpha-naphthylamine —> beta-naphthol, the product of the reaction between benzoic-acid-3:5-disulfonchloride and the azo dye benzidine ==> (beta-naphthol)₂, the product of the reaction between benzoic-acid-m-sulfon-chloride and the azo dye p-anisidine—>p-cresol, the product of the reaction between benzoic-acid-m-sulfon-chloride and the azo dye 4-chloro-2-amino-toluene—> 2':3'-hydroxy-naphthoyl-2-amino-4-methoxy-toluene, the product of the reaction between benzoic-acid-m-sulfon-chloride and the azo dye 4-chloro-2-amino-anisole—>2':3'-hydroxy-naphthoyl-2-amino-anisole, the product of the action of benzoic-acid-m-sulfon-chloride upon the azo dye 4-nitro-2-amino-toluene—> 2:3-hydroxy-naphthoic-acid-anilide, the product obtained by the action of benzoic-acid-3:5-disulfon-chloride upon 1:5-di-(benzoyl-amino)-4:8-dihydroxy-anthraquinone, the product obtained by the action of 4-chloro-methyl-benzoyl-chloride in pyridine solution upon the azo dye 2 - methyl-4:4'-diamino - 5 - methoxy - azo benzene==>(beta-naphthol)₂, the product obtained by the action of benzoic-acid-disulfon-chloride upon the azo dye xylidine—>2-(m-amino-benzoyl-amino)-5-hydroxy-naphthalene-7-sulfonic acid—>beta-naphthol, the product of the reaction in pyridine between 4-chloro-methyl-benzoyl-chloride and the azo dye alpha-naphthylamine—>beta-naphthol, the product of the reaction of benzoic-acid-3:5-disulfon-chloride upon the azo dye aniline—>2:4-dihydroxy-quinoline, the product of the reaction of benzoic-acid-3:5-disulfon-chloride upon the azo dye 4:4'-diamino-diphenyl-urea==>(beta-naphthol)₂ the product of the reaction of benzoic-acid-m-sulfon-chloride upon the azo dye 4:4'-diamino-diphenyl-amine==>(beta-naphthol)₂ the product of the reaction of benzoic-acid-3:5-disulfon-chloride upon 1-hydroxy - 4 - (p - tolylamino)-anthraquinone, the product of the reaction in pyridine between 4-(chloro-methyl)-benzoyl chloride upon dihydroxy - N - dihydro-1:2:2':1'-anthraquinone-azine, the product of the reaction in pyridine between 4-(chloro-methyl)-benzoyl-chloride and Erichrome Azurol (color index No. 720), the product of the reaction in pyridine between 4-(chloro-methyl)-benzoyl-chloride and Modern Violet (color index No. 892), and the products made by condensing 1 mol of cyanuric chloride with any of the following combinations, namely:

Two mols of 1- or 2-amino-anthraquinone and one mol of ammonia,
Two mols of 2-amino-anthraquinone and one mol of ethylamine,
Two mols of 2-amino-anthraquinone and one mol of para toluidine,
Two mols of 2-amino-anthraquinone and one mol of alpha naphthylamine,
Two mols of 2-amino-anthraquinone and one mol of beta naphthylamine,
Two mols of 2-amino-anthraquinone and one mol of mono-amyl-amine,
One mol of 1-amino-anthraquinone and two mols of aniline
or
Two mols of 1-amino-4-methoxy-anthraquinone and one mol of ammonia.

Various other acyl groups can be used instead of those mentioned in the foregoing examples for the purpose of solubilizing the described insoluble dyes and hydrolyzed off by similar means after the solubilized dyes are applied to the fiber. As illustrations of such are mentioned the acyl groups corresponding to the following acids: benzene-1,3-disulfonic acid, naphthalene-1,3,6-trisulfonic acid, naphthalene-1,5-disulfonic acid, benzene-1,3,5-tricarboxylic acid, benzene-hexacarboxylic acid, toluene-2,4-disulfonic acid, sulfoacetic acid, sulfobutyric acid, the condensation product of 4-(chloro-methyl)-benzoyl chloride and pyridine, and many others of the kind. The described type of assistants give improved results which are similar to those heretofore described with the dyes which are solubilized with such solubilizing agents.

The esters of the described classes have a marked beneficial effect in printing with the described dyestuffs. There is a possibility that the ester affects the particle size or state of division of the insoluble dyestuff when saponification of the water-solubilized dye derivative takes place on the fiber, thus causing the fiber to be colored a brighter and stronger shade. There is also a possibility that the ester causes a swelling of the fiber which assists in the penetration of the color into the fiber. The causes for the beneficial effect of the described esters are not well understood and it is to be understood that the invention is not limited by the suggested theories.

The printing pastes containing the water-solubilized derivatives of the described class of dyes and the described esters produce brighter and stronger prints from a given quantity of color than can be obtained without the assistants. The strength and brilliancy of the prints is obtained in accordance with the present invention without the use of compounds having unpleasant odor, undesirable instability, and other disadvantages. Wide variations in the processes can be made, such as the use of various alkalis for saponification instead of caustic soda and the use of suitable organic and other inorganic acids instead of hydrochloric acid. It will be understood that variations in the time, temperatures of treatment and the concentration of the several agents can be made.

From the foregoing disclosure it will be recognized that the invention is susceptible of modification without departing from the spirit and scope thereof and it is to be understood that the invention is not restricted to the specific illustrations thereof herein set forth.

We claim:

1. A hydrous printing paste which contains a thickener which is sufficient to make the paste suitably viscous for printing; a water-soluble condensation product of a substantially insoluble dye which is represented by the formula R—M in which R is the radical of an insoluble dye which contains at least one condensible group of the class consisting of hydroxy and imino, and M is an acyl radical which is connected to the residue of said condensible group, said acyl group being capable of rendering the dye water-soluble and of being hydrolyzed off and of generating thereby the insoluble dyestuff by the action of an alkaline agent after the solubilized dyestuff is applied to the fiber; at least sufficient of an alkaline buffer to prevent the paste from becoming acid but insufficient to hydrolyze said water-soluble compound before it is applied to the fiber; and at least 1% of an ester of a mono-hydroxy aliphatic carboxylic acid which is represented by the formula $(HO-C_nH_{2n}-COO)_m-R-(OH)_{x-m}$ in which $n$ is 1 to 3; $-R-(OH)_{x-m}$ is the residue of an alcohol from a group consisting of ethylene glycol, propylene glycol, glycerol and trimethylene glycol; $x$ is the number of hydroxy groups in the alcohol and $m$ is an integer from 1 to the value of $x$.

2. A hydrous printing paste which contains a thickener which is sufficient to make the paste suitably viscous for printing; a water-soluble condensation product of a substantially insoluble dye which is represented by the formula R—M in which R is the radical of an insoluble dye which contains at least one condensible group of the class consisting of hydroxy and imino, and M is an acyl radical which is connected to the residue of said condensible group, said acyl group being capable of rendering the dye water-soluble and of being hydrolyzed off and of generating thereby the insoluble dyestuff by the action of an alkaline agent after the solubilized dyestuff is applied to the fiber; and about 7% to about 20% of an ester of a mono-hydroxy aliphatic carboxylic acid which is represented by the formula $(HO-C_nH_{2n}-COO)_m-R-(OH)_{x-m}$ in which $n$ is 1 to 3; $-R-(OH)_{x-m}$ is the residue of an alcohol from a group consisting of ethylene glycol, propylene glycol, glycerol and trimethylene glycol; $x$ is the number of hydroxy groups in said alcohol and $m$ is an integer from 1 to the value of $x$.

3. A hydrous printing paste which contains a thickener which is sufficient to make the paste suitably viscous for printing; a water-soluble condensation product of a substantially insoluble dye which is represented by the formula R—M in which R is the radical of an insoluble dye which contains at least one condensible group of the class consisting of hydroxy and imino, and M is an acyl radical which is connected to the residue of said condensible group, said acyl group being capable of rendering the dye water-soluble and of being hydrolyzed off and of generating thereby the insoluble dyestuff by the action of an alkaline agent after the solubilized dyestuff is applied to the fiber; and about 7% to about 20% of an ester of a mono-hydroxy aliphatic carboxylic acid in which the acid group is represented by the formula $(OH-CH_2-COO)_m$ in which $m$ is an integer not greater than 2 and the alcohol radical is the residue of ethylene glycol.

4. The composition in accordance with claim 3 which contains at least sufficient of an alkaline buffer to prevent the paste from becoming acid but insufficient to hydrolyze said water-soluble compound before it is applied to the fiber.

5. The composition in accordance with claim 3 in which the ester is ethylene glycol-mono-glycolic acid ester.

6. The composition in accordance with claim 3 in which the ester is ethylene glycol-diglycolic acid ester.

7. A hydrous printing paste which contains a thickener which is sufficient to make the paste suitably viscous for printing; a water-soluble condensation product of a substantially insoluble dye which is represented by the formula R—M in which R is the radical of an insoluble dye which contains at least one condensible group of the class consisting of hydroxy and imino, and M is an acyl radical which is connected to the residue of said condensible group, said acyl group being capable of rendering the dye water-soluble and of being hydrolyzed off and of generating thereby the insoluble dyestuff by the action of an alkaline agent after the solubilized dyestuff is applied to the fiber; and about 7% to about 20% of an ester of a mono-hydroxy aliphatic carboxylic acid in which the acid group is represented by the formula $(OH-CH_2-COO)_m$ in which $m$ is an integer not greater than 2 and the alcohol radical is the residue of glycerol.

8. The composition in accordance with claim 3 in which the ester is glycerol-mono-glycolic acid ester.

LESTER E. SCHNIEPP.
WILBER O. TEETERS.